(12) United States Patent
Blake et al.

(10) Patent No.: US 9,415,426 B1
(45) Date of Patent: Aug. 16, 2016

(54) PIPE CLEANING APPARATUS

(76) Inventors: Tandie Blake, Winnfield, LA (US);
Cody Martin, Goldonna, LA (US);
Joseph P. Wade, Silver Point, TN (US)

( * ) Notice: Subject to any disclaimer, the term of this patent is extended or adjusted under 35 U.S.C. 154(b) by 1127 days.

(21) Appl. No.: 13/474,021

(22) Filed: May 17, 2012

Related U.S. Application Data

(60) Provisional application No. 61/519,101, filed on May 17, 2011.

(51) Int. Cl.
*B08B 9/02* (2006.01)
*B08B 3/02* (2006.01)
*B08B 9/023* (2006.01)

(52) U.S. Cl.
CPC *B08B 3/024* (2013.01); *B08B 9/023* (2013.01)

(58) Field of Classification Search
CPC ......... B08B 9/023; Y10S 118/11; B24C 3/06; B24C 3/32; B05B 13/0436
USPC ........... 134/198, 199, 172, 181, 180, 34, 153, 134/200, 152, 165, 22.11, 37; 118/DIG. 11, 118/307, 305, 323, 108, 208, 326, 73; 451/92, 76, 89, 38, 51, 102, 37; 15/104.4, 88, 256.53, 302, 309.1, 320
See application file for complete search history.

(56) References Cited

U.S. PATENT DOCUMENTS

| | | | | | |
|---|---|---|---|---|---|
| 3,984,254 | A | * | 10/1976 | Alexandrov | B65G 51/04 134/116 |
| 5,069,234 | A | * | 12/1991 | Nielsen | B08B 9/023 118/307 |
| 5,385,609 | A | * | 1/1995 | Rose | B24C 3/32 118/119 |
| 5,398,461 | A | * | 3/1995 | Rose | B24C 3/32 15/104.04 |

* cited by examiner

*Primary Examiner* — David Cormier
*Assistant Examiner* — Thomas Bucci
(74) *Attorney, Agent, or Firm* — R. Keith Harrison

(57) ABSTRACT

A pipe cleaning apparatus includes an apparatus support frame having an elongated carriage frame member; at least one pipe blasting assembly carried by the carriage frame member of the apparatus support frame and including an assembly carriage carried by the carriage frame member, a pair of generally elongated, semicircular assembly jaws pivotally carried by the assembly carriage and each having a jaw interior, a plurality of spaced-apart blast nozzles carried by each of the assembly jaws in the jaw interior and a blast pump communicating with the plurality of blast nozzles; and a linear actuator engaging the at least one pipe blasting assembly and operable to facilitate travel of the pipe blasting assembly along the carriage frame member.

16 Claims, 14 Drawing Sheets

PIPE CLEANING APPARATUS

CROSS-REFERENCE TO RELATED APPLICATIONS

This application claims the benefit of U.S. provisional application No. 61/519,101, filed May 17, 2011 and entitled PIPE CLEANING APPARATUS, which provisional application is hereby incorporated by reference herein in its entirety.

FIELD

Illustrative embodiments of the disclosure generally relate to apparatuses for reconditioning the exterior surfaces of underground pipes. More particularly, illustrative embodiments of the disclosure relate to a pipe cleaning apparatus which is simple in design and is suitable for expeditiously and efficiently removing rust, dirt, residual coatings and/or other contaminants from the exterior surface of a pipe in reconditioning of the pipe.

BACKGROUND

Underground pipes are frequently used to convey various fluids such as water, crude oil and natural gas. One of the drawbacks of using underground pipes to convey such fluids is that the buried pipes have a tendency to corrode over time. Therefore, before the pipes are buried, the exterior surfaces of the pipes are often coated with a protective corrosion-resistant primer or coating or wrapped in protective tape. However, the protective primer, coating or tape typically delays but does not indefinitely prevent corrosion of the pipe since it is gradually eroded from the surface of the pipe. Thus, the exterior surfaces of underground pipes may require periodic reconditioning to curtail the effects of corrosion and extend the service life of the pipes.

In a typical pipe reconditioning operation, an underground pipe may be removed from the ground and contaminants such as rust and dirt and any residual coating may be initially removed from the exterior surface of the pipe. A replacement protective primer or coating may then be applied to the exterior surface of the pipe before the pipe is again buried. One method of removing the contaminants and residual coating from the pipe may include blasting a particulate material such as metal shot or sand particles against the exterior surface of the pipe to dislodge the contaminants and/or residual coating from the pipe surface. However, conventional apparatuses which are used to blast or dislodge contaminants and coatings from the surface of a pipe in reconditioning of the pipe are often complex in design and slow and laborious to set up, operate and disassemble.

Therefore, a pipe cleaning apparatus which is simple in design and suitable for expeditiously and efficiently removing contaminants and coatings from the exterior surface of a pipe in reconditioning of the pipe is needed.

SUMMARY

The disclosure is generally directed to a pipe cleaning apparatus which is simple in design and suitable for expeditiously and efficiently removing contaminants and coatings from the exterior surface of a pipe in reconditioning of the pipe. An illustrative embodiment of the pipe cleaning apparatus includes an apparatus support frame having an elongated carriage frame member; at least one pipe blasting assembly carried by the carriage frame member of the apparatus support frame and including an assembly carriage carried by the carriage frame member, a pair of generally elongated, semicircular assembly jaws pivotally carried by the assembly carriage and each having a jaw interior, a plurality of spaced-apart blast nozzles carried by each of the assembly jaws in the jaw interior and a blast pump communicating with the plurality of blast nozzles; and a linear actuator engaging the at least one pipe blasting assembly and operable to facilitate travel of the pipe blasting assembly along the carriage frame member.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. As used herein, relative terms such as "upper", "lower", "front" and "back" are used to describe exemplary positions of various components relative to each other and shall not be construed in a limiting sense.

Figure 1:
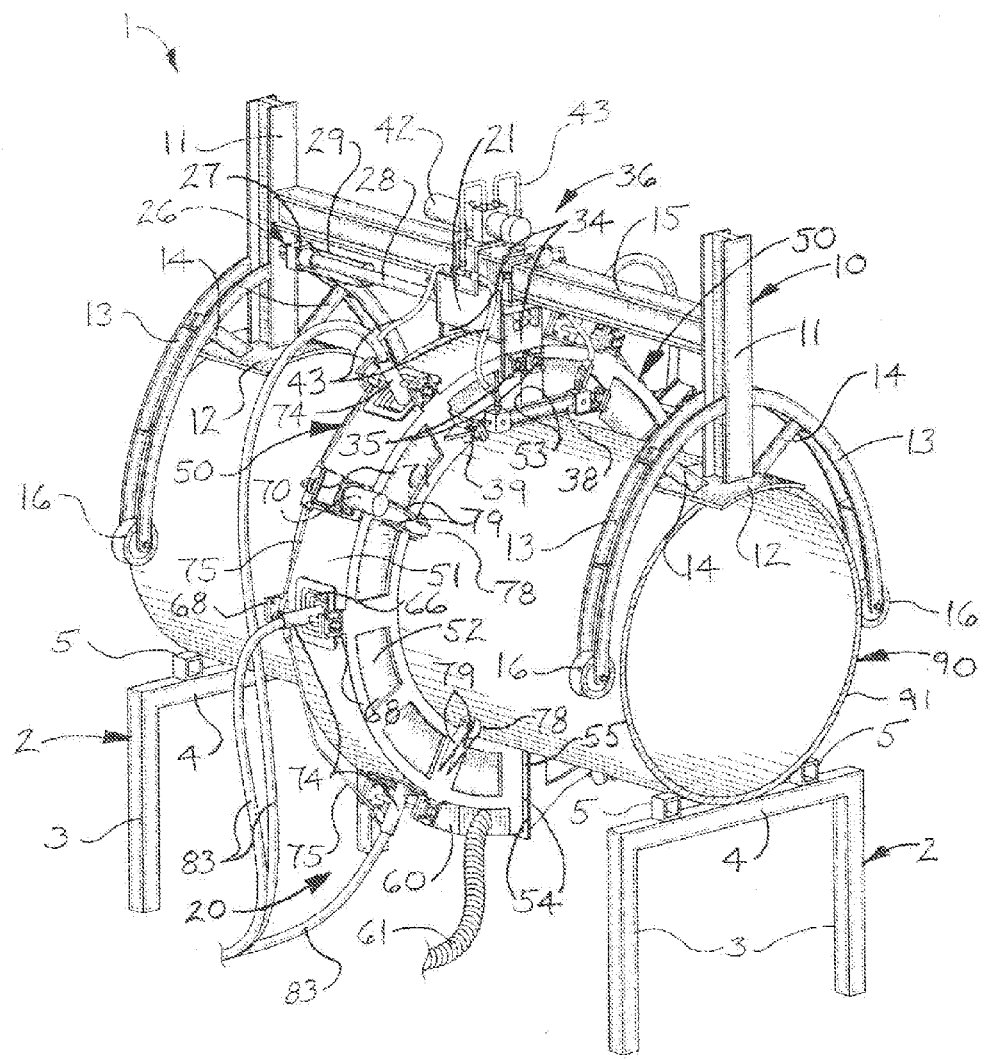
FIG. 1 is a perspective view of an illustrative embodiment of the pipe cleaning apparatus, placed in functional position on a pipe in exemplary application of the apparatus.
Figure 2:
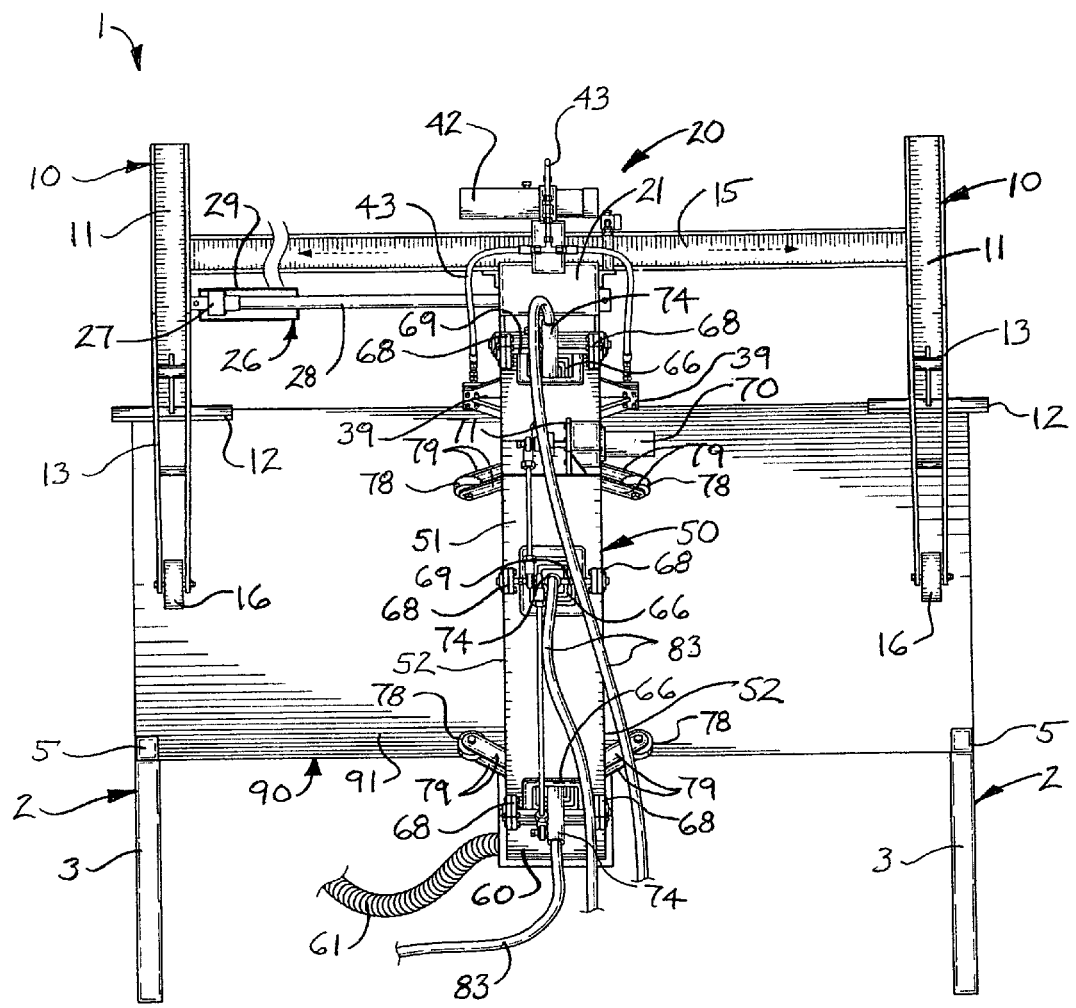
FIG. 2 is a side view of an illustrative embodiment of the pipe cleaning apparatus placed in functional position on the pipe.
Figure 3:
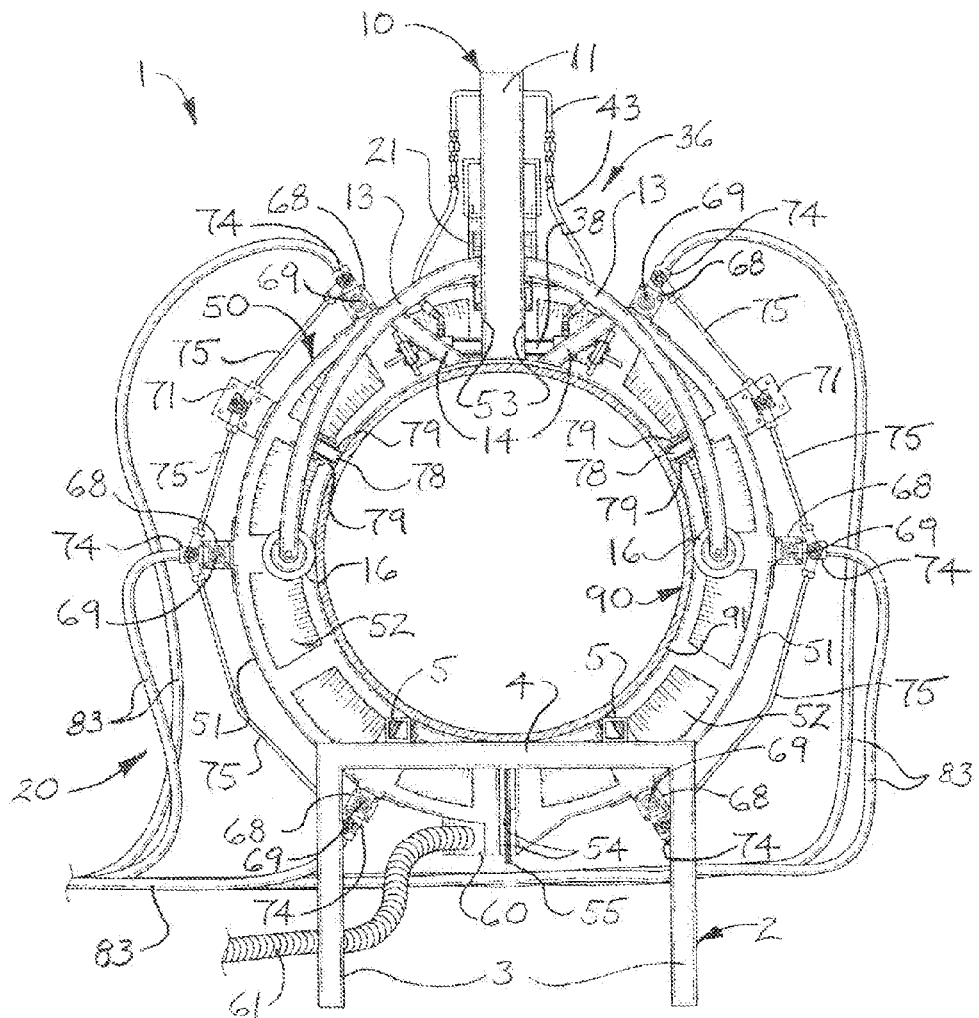
FIG. 3 is an end view of an illustrative embodiment of the pipe cleaning apparatus placed in functional position on the pipe, with a pair of assembly jaws of the apparatus closed around the pipe.
Figure 4:
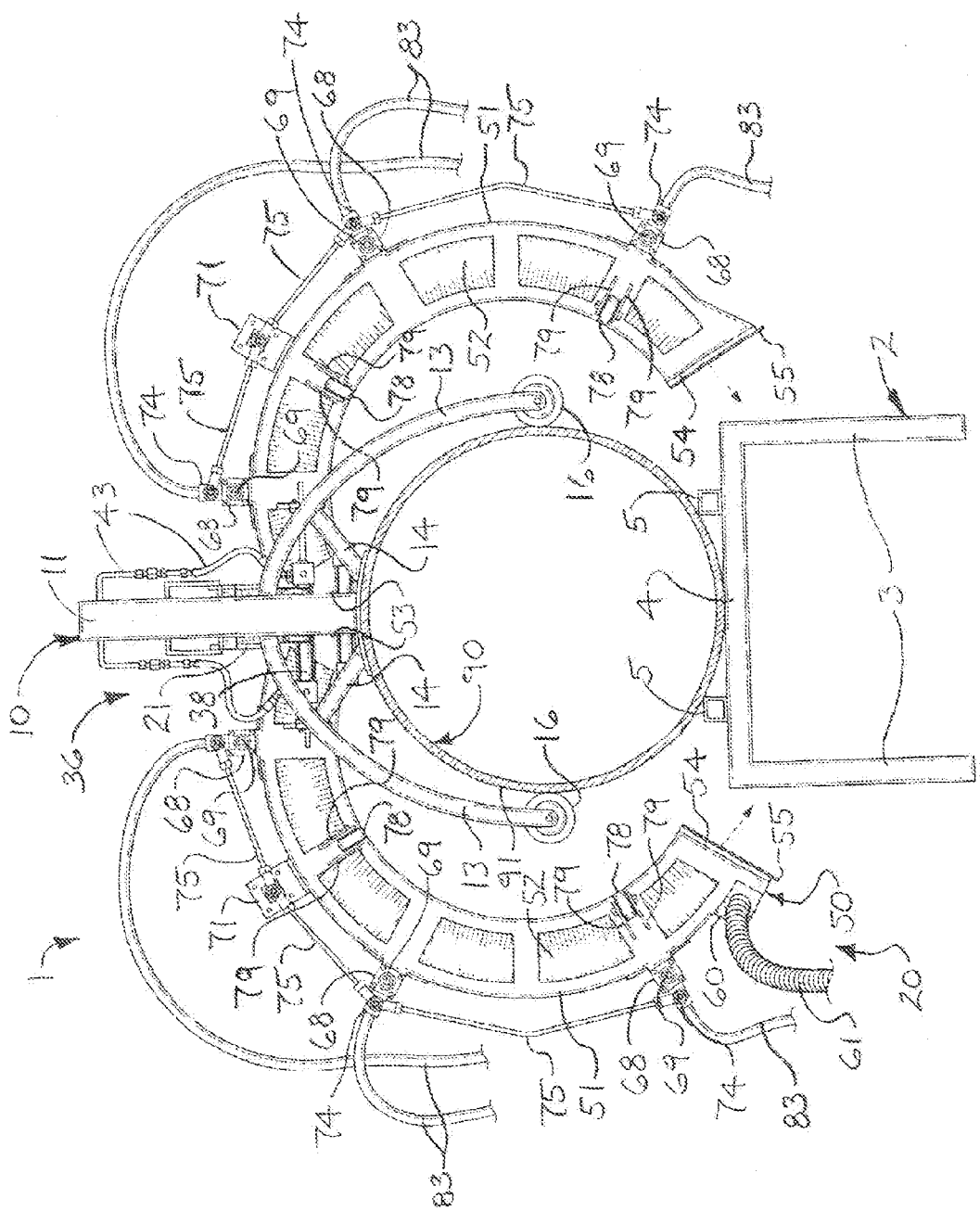
FIG. 4 is an end view of an illustrative embodiment of the pipe cleaning apparatus placed in functional position on the pipe (illustrated in cross-section), with the assembly jaws of the apparatus in an open position.

Referring initially to FIGS. 1-7 of the drawings, an illustrative embodiment of the pipe cleaning apparatus is generally indicated by reference numeral 1. The pipe cleaning apparatus 1 may include a pipe support frame 2 which may be adapted to support a pipe 90 the exterior surface 91 of which is to be cleaned by operation of the pipe cleaning apparatus 1, as will be hereinafter described. In some embodiments, the pipe support frame 2 may include multiple pairs of spaced-apart frame legs 3 and a connecting frame member 4 which connects each pair of frame legs 3. A pair of spaced-apart pipe stabilizers 5 may be provided on the connecting frame member 4. Accordingly, as illustrated in FIGS. 1, 3 and 4, the pipe 90 may be inserted between the pipe stabilizers 5 and rested on the respective connecting frame members 4 such that the pipe stabilizers 5 hold or stabilize the pipe 90 in place for cleaning, as will be hereinafter described. It will be recognized and understood that the pipe support frame 2 which was heretofore described with respect to FIGS. 1-4 is only one example of a support frame which is suitable to hold the pipe 90 in place during operation of the pipe cleaning apparatus 1. The pipe support frame 2 may have alternative designs which are known or can be contrived by those skilled in the art and are suitable for the purpose.

The pipe cleaning apparatus 1 may further include an apparatus support frame 10 and at least one pipe blasting assembly 20 on the apparatus support frame 10. In some embodiments, the apparatus support frame 10 may be adapted to engage the pipe 90 and center the pipe blasting assembly 20 on the pipe 90. Accordingly, the apparatus support frame 10 may include a pair of generally parallel, spaced-apart, vertical end frame supports 11. A generally horizontal carriage frame member 15 may connect the end frame supports 11. A frame foot plate 12 may terminate a lower end of each end frame support 11. The frame foot plate 12 may be curved to generally match the complementary curved contour of the exterior pipe surface 91 of the pipe 90. As illustrated in FIGS. 1, 3 and 4, a pair of frame stabilizer arms 13 may extend outwardly from opposite sides of each end frame support 11. Each frame stabilizer arm 13 may be generally elongated and curved, as illustrated, or may have any other suitable alternative shape. Frame stabilizer braces 14 may extend between the frame foot plate 12 and each frame stabilizer arm 13 for reinforcement purposes. A frame stabilizer wheel 16 may be provided on each frame stabilizer arm 13. As illustrated in FIGS. 3 and 4, the frame stabilizer wheels 16 may be adapted to engage the exterior pipe surface 91 on opposite sides of the pipe 90 and stabilize the apparatus support frame 10 on the pipe 90 in operation of the pipe cleaning apparatus 1. The apparatus support frame 10 may have alternative designs which are known by those skilled in the art and suitable for the purpose. For example and without limitation, in some embodiments the end frame supports 11 may be sized and configured to rest on the ground (not illustrated) at respective ends of the pipe 90 rather than or in addition to engaging the pipe 90 at the frame foot plates 12; as illustrated.

Each pipe blasting assembly 20 of the pipe cleaning apparatus 1 may include an assembly carriage 21 which is adapted for bidirectional travel along the carriage frame member 15 of the apparatus support frame 10. A linear actuator 26 may be provided on one of the end frame supports 11 of the apparatus support frame 10. The linear actuator 26 may be conventional, including an actuator base 27 provided on the end frame support 11 and an elongated actuator arm 28 which is extendable from the actuator base 27. An actuator motor 29 on the actuator base 27 may engage the actuator arm 28 to facilitate extension and retraction of the actuator arm 28 with respect to the actuator base 27. The distal or extending end of the actuator arm 28 may engage the assembly carriage 21 of the pipe blasting assembly 20. Accordingly, by operation of the actuator motor 29, the actuator arm 28 is selectively extended and retracted with respect to the actuator base 27 to facilitate travel of the pipe blasting assembly 20 in a selected direction on the carriage frame member 15 of the apparatus support frame 10. It will be recognized and understood that alternative mechanisms which are known or can be contrived by those skilled in the art may be used to move the pipe blasting assembly 20 along the frame connecting member 15 of the apparatus support frame 10.

Each pipe blasting assembly 20 may further include a pair of complementary assembly jaws 50 pivotally mounted on the assembly carriage 21 such as in a manner which will be hereinafter described. Each assembly jaw 50 may be generally elongated and semicircular. Accordingly, the assembly jaws 50 may be positional between a closed position in which the assembly jaws 50 are closed around the pipe 90, as illustrated in FIG. 3, and an open position in which the assembly jaws 50 disengage the pipe 90, as illustrated in FIG. 4. As illustrated in the cross-sectional view of FIG. 5A, each assembly jaw 50 may include an outer jaw wall 51, a pair of spaced-apart side jaw walls 52 which extend from the outer jaw wall 51 and a jaw interior 56. As illustrated in FIGS. 3 and 4, each assembly jaw 50 may further include a proximal jaw end 53 which is pivotally attached to the assembly carriage 21 and a distal jaw end 54 which is opposite the proximal jaw end 53. A jaw flange 55 may terminate the distal jaw end 54 of each assembly jaw 50. As illustrated in FIGS. 1 and 3, when the assembly jaws 50 are in the closed position, the jaw flanges 55 at the distal jaw ends 54 may engage each other. As illustrated in FIGS. 1-4, a suction box 60 may be provided generally at the distal jaw end 54 adjacent to the jaw flange 55 on one of the assembly jaws 50 and communicates with the jaw interior 56 (FIG. 5A) for purposes which will be hereinafter described.

As illustrated in FIG. 2, at least one assembly jaw roller 78 may be provided on each side of each assembly jaw 50. Each assembly jaw roller 78 may be mounted between a pair of roller flanges 79 which extends outwardly from a corresponding side jaw wall 52 of the assembly jaw 50. Accordingly, the jaw rollers 78 may be adapted to engage the exterior pipe surface 91 of the pipe 90 and stabilize the assembly jaws 50 on the pipe 90 when the assembly jaws 50 are deployed in the closed position on the pipe 90 as illustrated in FIG. 3.

The proximal jaw end 53 of each assembly jaw 50 may be pivotally attached to the assembly carriage 21 according to any suitable arrangement which is known by those skilled in the art. As illustrated in FIG. 1, in some embodiments, a pair of spaced-apart jaw mount plates 34 may extend from opposite ends of the assembly carriage 21. At least one jaw mount hinge pin 35 may extend through registering pin openings (not illustrated) in each jaw mount plate 34 and the proximal jaw end 53 of the corresponding assembly jaw 50, respectively.

A jaw actuation mechanism 36 may operably engage the assembly jaws 50 to facilitate selective opening and closing of the assembly jaws 50. In some embodiments, the jaw actuation mechanism 36 may include at least one double-acting pneumatic jaw actuation cylinder 38 (one of which is illustrated in FIG. 1), respective ends (not numbered) of which engage the respective assembly jaws 50. In some embodiments, the jaw actuation mechanism 36 may include a pair of double-acting pneumatic jaw actuation cylinders 38 at respective ends of the assembly carriage 21. Cylinder mount flanges 39 may mount the ends of each jaw actuation cylinder 38 to the respective assembly jaws 50. A hydraulic jaw actuation motor 42 may be disposed in fluid communication with the jaw actuation cylinder 38 through hydraulic conduits 43. Accordingly, the hydraulic jaw actuation motor 42 may be operated to pump hydraulic fluid (not illustrated) through the hydraulic conduits 43 into each jaw actuation cylinder 38 to extend the jaw actuation cylinder 38 and facilitate outward pivoting of the assembly jaws 50 on the jaw mount plates 34 at the respective jaw mount hinge pins 35 and opening of the assembly jaws 50 with respect to the pipe 90, as illustrated in FIG. 4. Conversely, the hydraulic fluid may be released from the jaw actuation cylinder 38 through the hydraulic conduits 43 to facilitate inward pivoting of the assembly jaws 50 on the jaw mount plates 34, as illustrated in FIG. 3, and closing of the assembly jaws 50 around the pipe 90. It will be recognized and understood that alternative mechanisms which are known or can be contrived by those skilled in the art, including one or more electric motors (not illustrated), for example and without limitation, may be used to pivot the assembly jaws 50 between the closed position illustrated in FIG. 3 and the open position illustrated in FIG. 4.

Multiple spaced-apart blast nozzles 74 may be mounted in the jaw interior 56 of each assembly jaw 50. In some embodiments, each blast nozzle 74 may be mounted for pivoting movement in the jaw interior 56. Accordingly, as most clearly illustrated in FIGS. 1, 2 and 5, multiple boot openings 64 (FIG. 5) may extend through the outer jaw wall 51 of the assembly jaw 50 in spaced-apart relationship to each other. A flexible, typically rubber nozzle boot 66 having a nozzle opening (not illustrated) may be seated in each boot opening 64.

Figure 5:
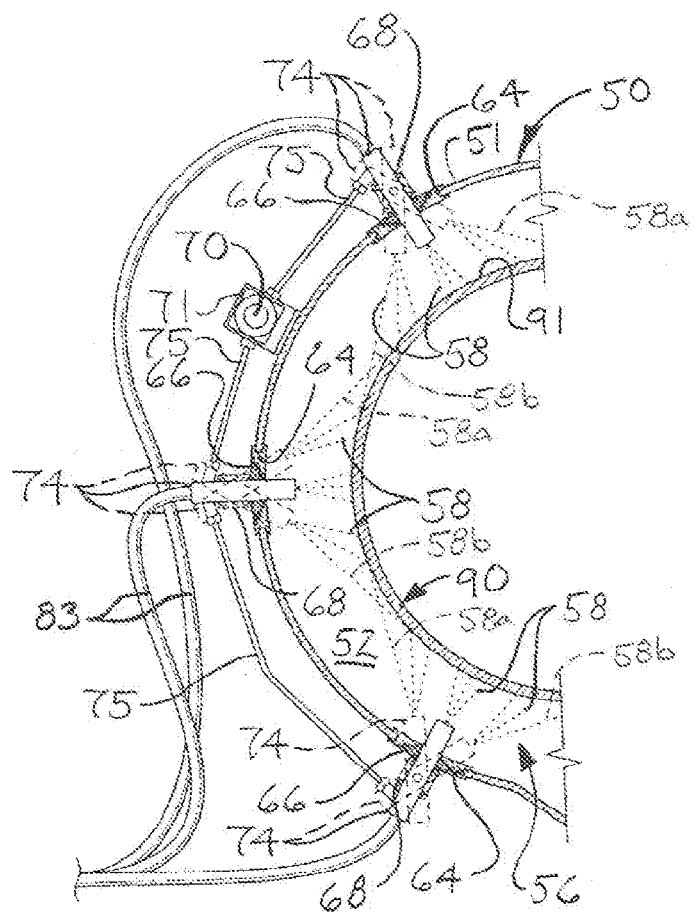
FIG. 5 is a sectional view of a portion of an assembly jaw of an illustrative embodiment of the pipe cleaning apparatus, placed in functional position on a pipe (illustrated in section) and more particularly illustrating ejection of particulate material against the exterior surface of the pipe in exemplary application of the apparatus.
Figure 5A:
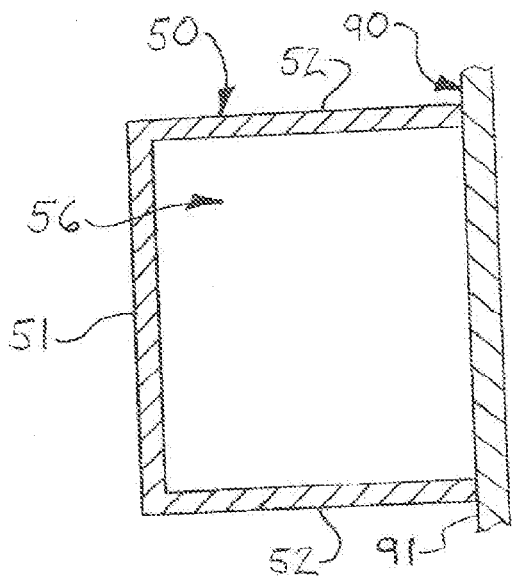
FIG. 5A is a cross-sectional view of an assembly jaw engaging an exterior surface of a pipe.

As illustrated in FIG. 1, a pair of spaced-apart nozzle mount brackets 68 may be provided on the outer jaw wall 51 on opposite sides of each nozzle boot 66. A nozzle mount shaft 69 may extend between the nozzle mount brackets 68. Each blast nozzle 74 may be pivotally mounted on a corresponding nozzle mount shaft 69 and extends into the jaw interior 56 through the nozzle opening of each corresponding nozzle boot 66, as illustrated in FIG. 5.

A nozzle actuator motor 70 may be provided on the outer jaw wall 51 of the assembly jaw 50. A motor bracket 71 may mount the nozzle actuator motor 70 to the outer jaw wall 51. Nozzle linkages 75 may connect the nozzle actuator motor 70 to each blast nozzle 74. Accordingly, responsive to operation of the nozzle actuator motor 70, the nozzle linkages 75 pivot the blast nozzles 74 in concert on the respective nozzle mount shafts 69 such that the discharge end (not numbered) of each blast nozzle 74 moves in a back-and-forth trajectory in the jaw interior 56 of the assembly jaw 50, as illustrated in FIG. 5.

Figure 6:
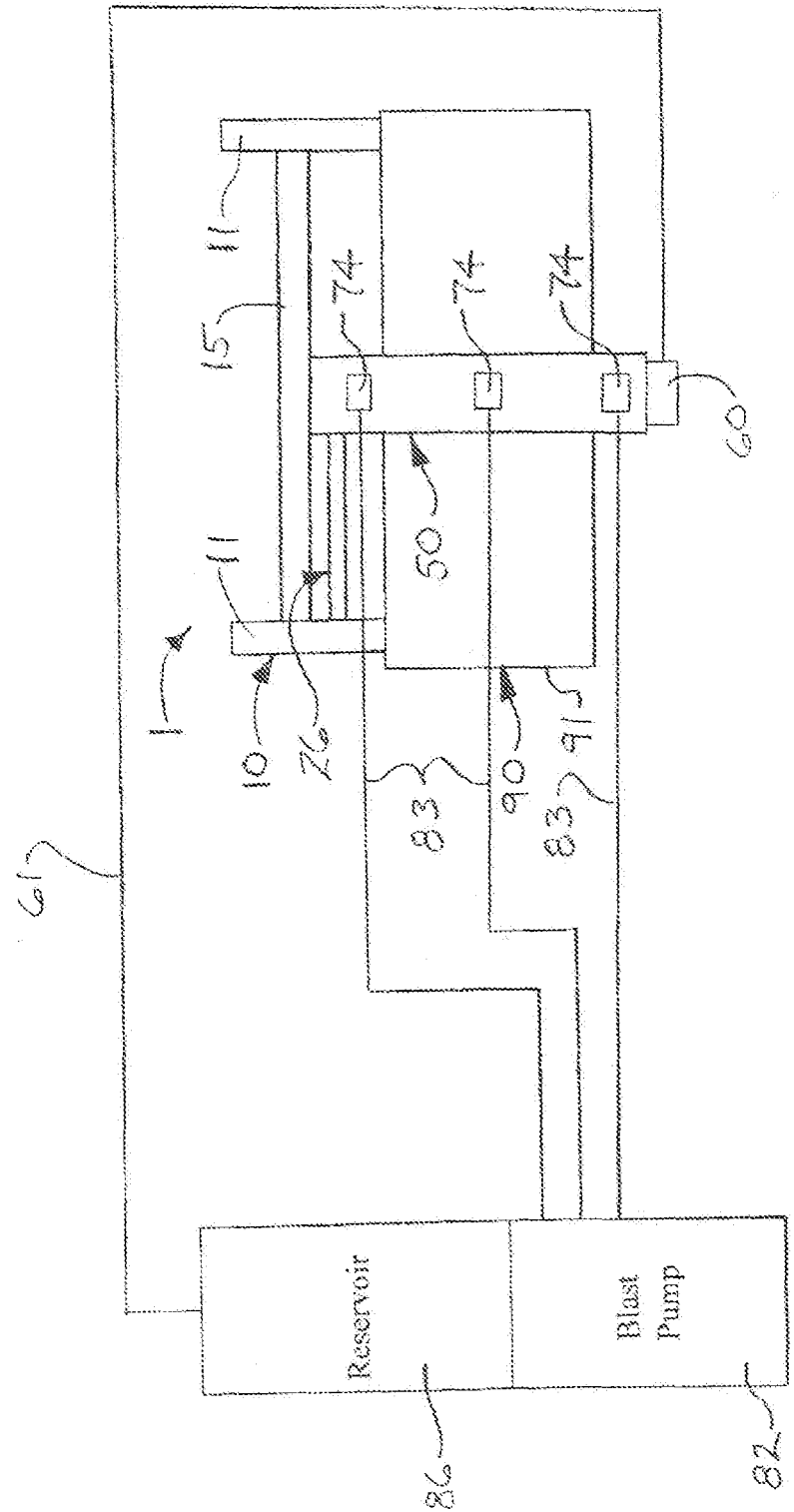
FIG. 6 is a block diagram of an illustrative embodiment of the pipe cleaning apparatus, more particularly illustrating exemplary connection of a particulate material reservoir and a blast pump to the various functional components of the apparatus.

As illustrated in FIG. 6, a blast pump 82 may be disposed in communication with each blast nozzle 74 of each assembly jaw 50 of each pipe blasting assembly 20 through blast tubing 83. A reservoir 86 may be provided above the blast pump 82. A supply of particulate material 58 (FIG. 5) may be contained in the reservoir 86. The particulate material 58 may be sand, metal shot or other particulate material which is consistent with the functional requirements of the particulate material 58. The suction box 60 (FIGS. 1-4) on one of the assembly jaws 50 of each pipe blasting assembly 20 may be disposed in communication with the reservoir 86 through a particulate material return hose 61. Accordingly, the blast pump 82 may be operated to draw particulate material 58 (FIG. 5) from the reservoir 86 and pump the particulate material 58 through the blast tubing 83. As further illustrated in FIG. 5, each blast nozzle 74 may be adapted to forcefully eject the particulate material 58 against the exterior pipe surface 91 of the pipe 90. The nozzle actuator motor 70 may be operated to pivot the blast nozzles 74 in the jaw interior 56 through the nozzle linkages 75. Thus, the blast nozzles 74 may be situated in such proximity to each other that the trajectory of the particulate material 58 which is ejected from each blast nozzle 74 against the pipe 90 overlaps the trajectory of the ejected particulate material 58 which is ejected from the adjacent blast nozzle 74. This ensures uniform and complete coverage of that portion of the pipe exterior 91 which is within the confines of the jaw interior 56 during operation of the pipe cleaning apparatus 1, which will be hereinafter further described.

Figure 7:
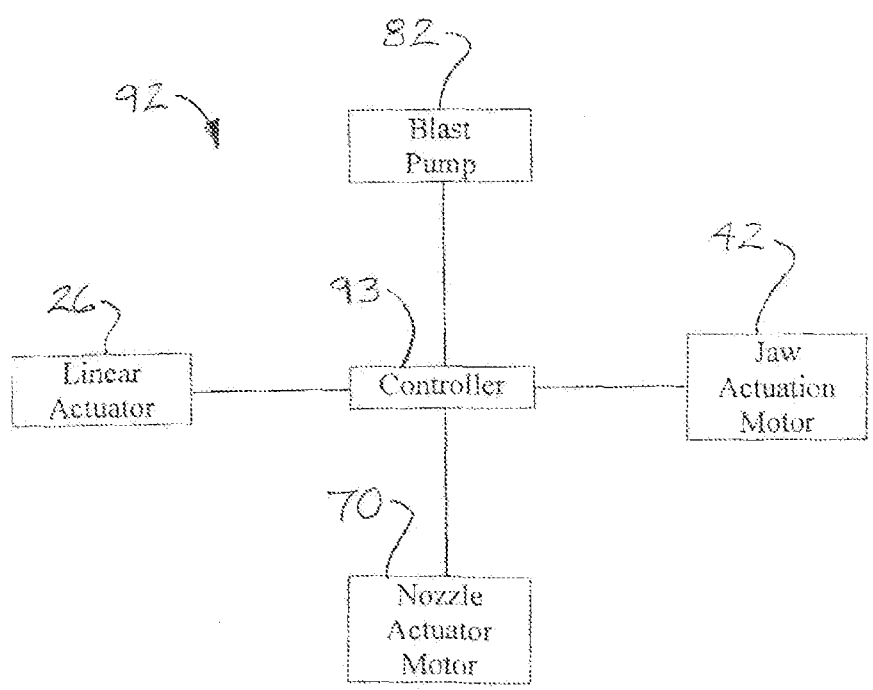
FIG. 7 is a block diagram of an apparatus control system which is suitable for operation of an illustrative embodiment of the pipe cleaning apparatus.

Referring next to FIG. 7 of the drawings, an exemplary apparatus control system 92 which is suitable for manual or automated control of the pipe cleaning apparatus 1 is illustrated. The apparatus control system 92 may include a controller 93. The linear actuator 26, the jaw actuation motor 42 and the nozzle actuator motors 70 of each pipe blasting assembly 20, as well as the blast pump 82, may interface with the controller 93. Accordingly, the controller 93 may be programmed to coordinate and operate the linear actuator 26, the jaw actuation motor 42 and the nozzle actuator motors 70 of each pipe blasting assembly 20 and the blast pump 82 during operation of the pipe cleaning apparatus 1 which will be hereinafter described.

As illustrated in FIGS. 1-6, in exemplary application of the pipe cleaning apparatus 1, a pipe 90 is placed in a generally horizontal position on the connecting frame members 4 between the pipe stabilizers 5 of the pipe support frame 2. In some applications, the pipe 90 may be an underground pipe which was extricated from the ground for reconditioning of the exterior pipe surface 91. Various contaminants (not illustrated) such as rust, dirt and residual coatings may require removal from the exterior pipe surface 91 as part of the reconditioning process. The apparatus support frame 10 is placed on the pipe 90 with the frame foot plates 12 and each pair of frame stabilizing wheels 16 on the frame stabilizing arms 13 typically engaging the exterior pipe surface 91. As it is lowered in place on the pipe 90 using a hoisting apparatus (not illustrated) which is suitable for the purpose, the assembly jaws 50 of the pipe blasting assembly 20 may be opened to the maximum position (FIG. 4) by operation of the jaw actuation motor 42 (FIG. 1) to provide sufficient clearance for placement of the assembly jaws 50 on opposite sides of the pipe 90. When the pipe blasting assembly 20 is positioned in place on the pipe 90, the jaw actuation motor 42 may again be operated to close the assembly jaws 50 against the respective sides of the pipe 90, as illustrated in FIG. 3. The linear actuator 26 may be operated to initially position the pipe blasting assembly 20 at one end of the carriage frame member 15 of the apparatus support frame 10.

A supply of the particulate material 58 (FIG. 5) is placed in the reservoir 86 (FIG. 6). The blast tubing 83 is connected to the blast pump 82 and to the respective blast nozzles 74 of each assembly jaw 50. The particulate material return hose 61 is connected to the reservoir 86 and the suction box 60, as illustrated in FIG. 6. The blast pump 82 is then operated to pump the particulate material 58 through the blast tubing 83 such that the particulate material 58 is forcefully ejected from each blast nozzle 74 against the exterior pipe surface 91 of the pipe 90, as illustrated in FIG. 5. Therefore, the ejected particulate material 58 dislodges the contaminants which remain on the exterior pipe surface 91, cleaning and preparing the exterior pipe surface 91 for subsequent steps of the reconditioning process. As further illustrated in FIG. 5, the nozzle actuator motor 70 may be operated to pivot the blast nozzles 74 in the jaw interior 56 through the nozzle linkages 75. Thus, the particulate material 58 is ejected from each blast nozzle 74 against the pipe 90 in a back-and-forth sweeping motion and overlaps the particulate material 58 which is ejected from the adjacent blast nozzle 74. Thus, substantially the entire portion of the pipe exterior 91 which lies within the confines of the jaw interior 56 is completely and uniformly cleaned by the ejected particulate material 58. The ejection paths 58a, 58b of the particulate material 58 at the opposite positional limits of each blast nozzle 74, typically constrained by the nozzle boot 60, may be tangential to the cross-sectional curvature or circumference of the exterior pipe surface 91.

Throughout blasting of the particulate material 58 against the exterior pipe surface 91, the blast pump 82 creates a partial vacuum pressure in the reservoir 86 and the particulate material return hose 61. Consequently, partial vacuum pressure is induced in the suction box 60 at the bottom or distal end of one of the assembly jaws 50. Therefore, after it is ejected from the blast nozzle 74 against the exterior pipe surface 91, the particulate material 58 falls into the bottom portion of the jaw interior 56 and is drawn by the partial vacuum pressure into the suction box 60 and then through the particulate material return hose 61 back into the reservoir 86. Due to the seal which is imparted between the assembly jaws 50 by the engaging jaw flanges 55, the particulate material 58 remains in the jaw interior 56 of each assembly jaw 50 until it is reclaimed through the suction box 60, the particulate material return hose 61 and the reservoir 86, and is therefore prevented from falling from the assembly jaws 50 to the ground beneath the pipe blasting assembly 20.

As the blast pump 82 is operated to eject the particulate material 58 from the blast nozzles 74 against the exterior pipe surface 91 of the pipe 90 and reclaim the particulate material 58 from the jaw interior 56 of each assembly jaw 50 to the reservoir 86, the linear actuator 26 may be operated, to move the pipe blasting assembly 20 along the carriage frame member 15 to the opposite end of the apparatus support frame 10. Accordingly, the particulate material 58 continually blasts and cleans the exterior pipe surface 91 throughout substantially the entire length of the pipe 90 during travel of the pipe blasting assembly 20 from one end to the opposite end of the apparatus support frame 10.

After cleaning of the exterior pipe surface 91 is completed, the blast pump 82 may be turned off. The jaw actuation motor 42 may then be operated to open the assembly jaws 50, as illustrated in FIG. 4, to facilitate removal of the pipe cleaning apparatus 1 from the pipe 90. In applications in which the apparatus 1 is used to treat a pipe 90 having a length which is greater than the length of the apparatus 1, the first segment of the exterior pipe surface 91 may be treated as was heretofore described. The assembly jaws 50 may next be opened, after which the apparatus support frame 10 is moved to an untreated segment of the pipe surface 91 which is adjacent to the treated segment. The apparatus 1 is then operated to treat the untreated segment of the exterior pipe surface 91. The foregoing procedure may be repeated until the pipe surface 91 of the entire length of the pipe 90 is treated.

Referring next to FIGS. 8-11 of the drawings, an illustrative embodiment of a pipe reconditioning system, hereinafter system, which may utilize the pipe cleaning apparatus 1 is generally indicated by reference numeral 101. In FIGS. 8-11, elements of the system 101 which correspond to the same elements of the pipe cleaning apparatus 1 in FIGS. 1-7 are designated by either the same numerals or by the same numerals in the 100 or 200 series. The system 101 may include a pipe support frame 102 and an apparatus support frame 110 which may have designs that are substantially the same as or similar to those of the pipe support frame 2 and the apparatus support frame 10, respectively, of the pipe cleaning apparatus 1 heretofore described with respect to FIGS. 1-4. At least one pipe blasting assembly 20 may be provided on the carriage frame member 115 of the apparatus support frame 110. The pipe blasting assembly 20 may have a design which is substantially the same as or similar to that of the pipe blasting assembly 20 heretofore described with respect to FIGS. 1-7.

At least one pipe coating assembly 120 may be provided on the carriage frame member 115 of the apparatus support frame 110. As illustrated in FIG. 9, in some embodiments, the pipe coating assembly 120 may have a design which is generally the same as or similar to that of the pipe blasting assembly 20 heretofore described with respect to FIGS. 1-7. Accordingly, the elements of the pipe coating assembly 120 which correspond to the same elements of the pipe blasting assembly 20 of the pipe cleaning apparatus 1 in FIGS. 1-7 are designated by the same numerals in the 100 series. As, illustrated in FIG. 9, in the pipe coating assembly 120, spray nozzles 174 are adapted to spray a coating liquid 158 against the exterior pipe surface 191 of the pipe 190. Coating tubing 183 may connect each spray nozzle 174 to a pump and supply system (not illustrated) which is adapted to contain a supply of the coating liquid 158 and pump the coating liquid 158 through the coating tubing 183 to each spray nozzle 174, from which the coating liquid 158 is discharged against the exterior pipe surface 191 of the pipe 190 in the jaw interior 156. In some applications, the coating liquid 158 may be a protective primer or coating which may be applied to the exterior pipe surface 191 as part of a reconditioning process for the pipe 190. The coating liquid 158 may be applied to the exterior pipe surface 191 after the exterior pipe surface 191 is cleaned and prepared by operation of the pipe blasting assembly 20 as was heretofore described and heated by operation of a pipe heating assembly 220 (FIG. 8), which will be hereinafter described. A linear actuator (not illustrated) or other suitable mechanism may engage the pipe coating assembly 120 to facilitate bidirectional travel of the pipe coating assembly 120 along the carriage frame member 115 of the apparatus support frame 110 according to the knowledge of those skilled in the art. In some embodiments, surplus or excess coating liquid 158 may be reclaimed from the pipe coating assembly 120 in a manner which is similar to that which was heretofore described with respect to reclaiming of the particulate material 58 from the pipe blasting assembly 20 of the pipe cleaning apparatus 1 in FIGS. 1-7.

Figure 8:
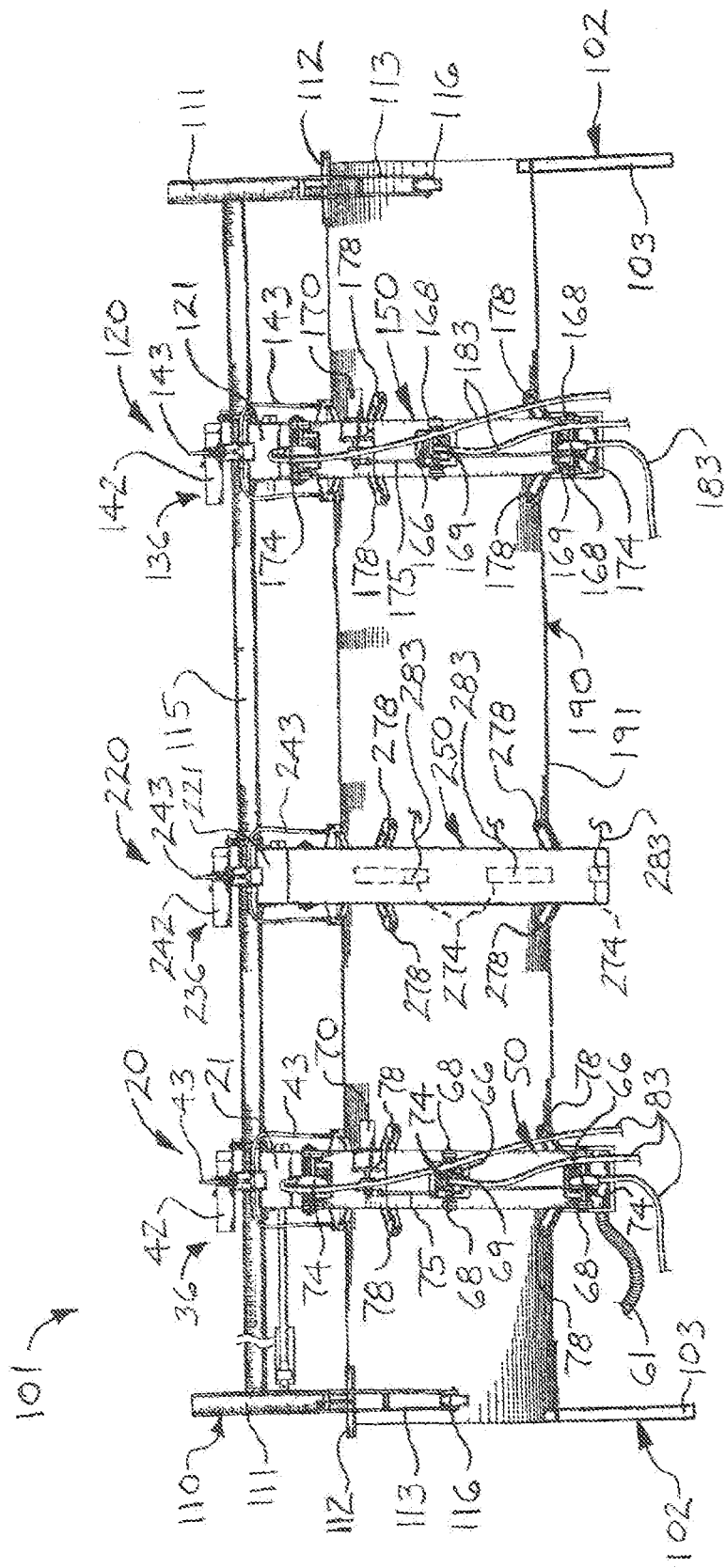
FIG. 8 is a side view of an illustrative embodiment of a pipe reconditioning system which utilizes an illustrative embodiment of the pipe cleaning apparatus.
Figure 9:
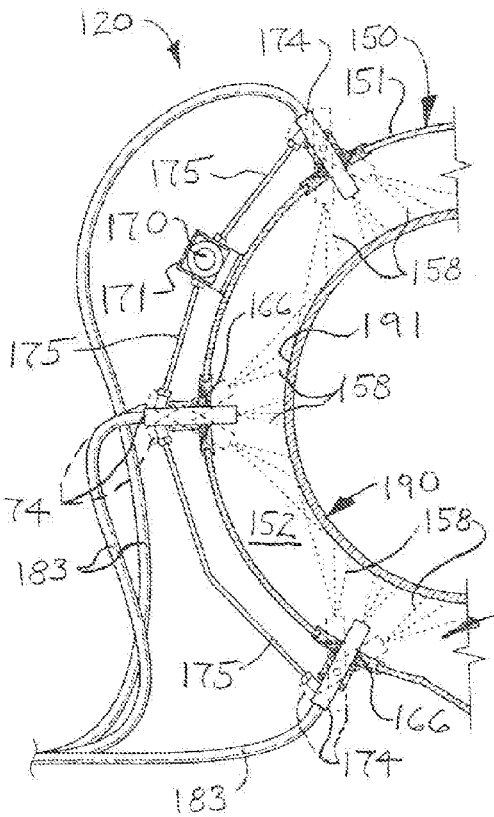
FIG. 9 is a sectional view of a portion of an assembly jaw of an illustrative embodiment of a pipe coating apparatus of the pipe reconditioning system illustrated in FIG. 8, placed in functional position on a pipe (illustrated in section) and more particularly illustrating spraying of a protective coating liquid against the exterior surface of the pipe in exemplary application of the apparatus.
Figure 10:
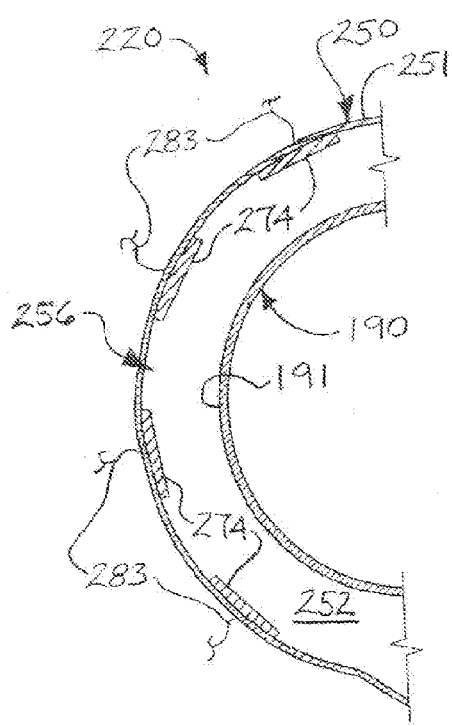
FIG. 10 is a sectional view of a portion of an assembly jaw of an illustrative embodiment of a pipe heating assembly of the pipe reconditioning system illustrated in FIG. 8, placed in functional position on a pipe (illustrated in section) and more particularly illustrating heating of the pipe to cure the sprayed-on protective coating liquid in exemplary application of the pipe heating assembly.

As further illustrated in FIG. 8, at least one pipe heating assembly 220 may be provided on the carriage frame member 115 of the apparatus support frame 110. The pipe heating assembly 220 may have some of the elements of the pipe blasting assembly 20 which was heretofore described with respect to FIGS. 1-7. In FIGS. 8 and 10, the elements of the pipe heating assembly 220 corresponding to the same elements of the pipe blasting assembly 20 in FIGS. 1-7 are designated by the same numerals in the 100 series. Accordingly, the pipe heating assembly 220 may include an assembly carriage 221 mounted for bidirectional travel along the carriage frame member 115 of the apparatus support frame 110; a pair of assembly jaws 250 pivotally attached to the assembly carriage 221; and a jaw actuation mechanism 236 adapted to selectively pivot the assembly jaws 250 with respect to the assembly carriage 221 between the open and closed positions with respect to the pipe 190.

Figure 11:
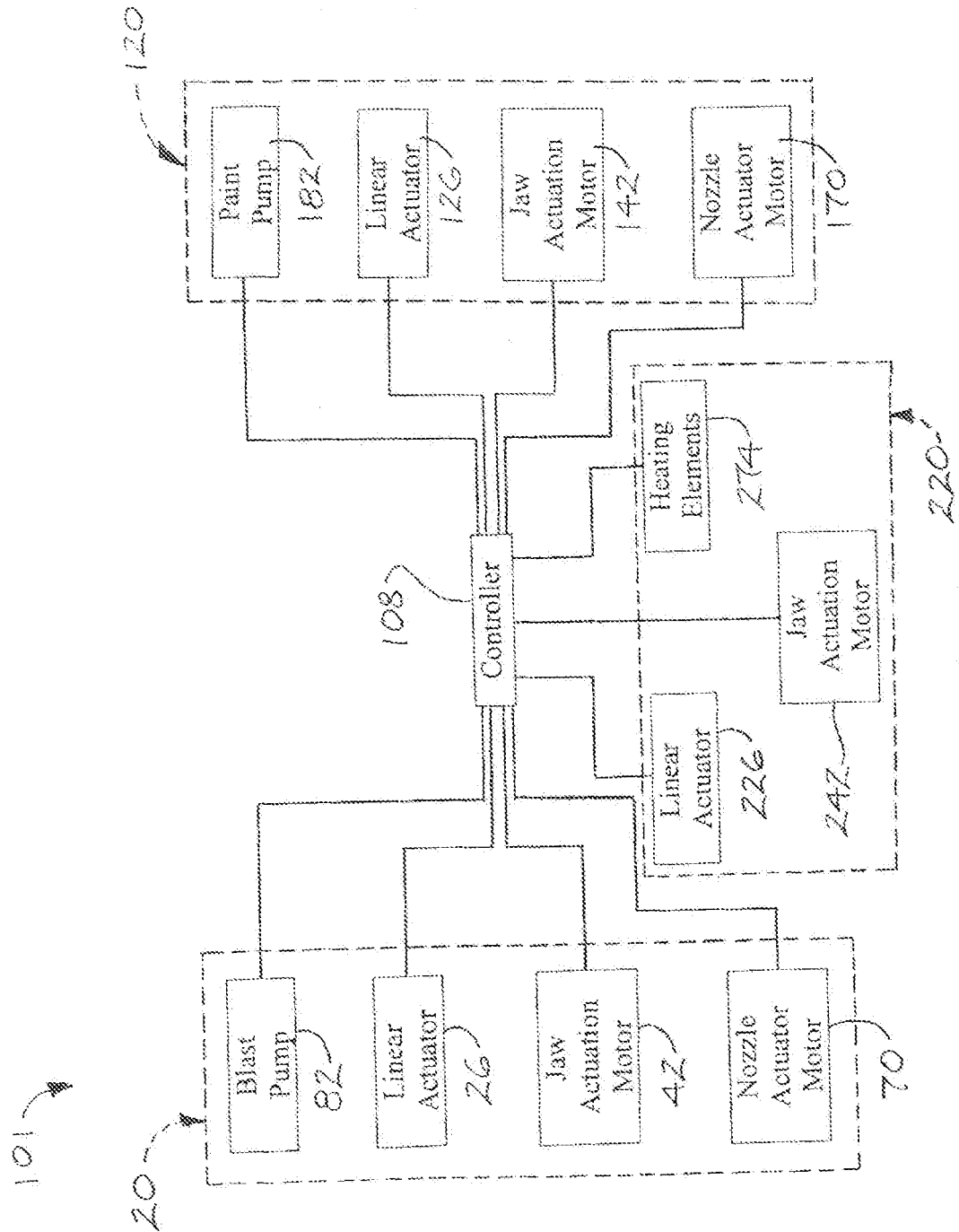
FIG. 11 is a functional block diagram of an illustrative embodiment of the pipe reconditioning system.

As illustrated in FIG. 10, at least one heating element 274 may be provided in the jaw interior 256 of each assembly jaw 250 of the pipe heating assembly 220. In some embodiments multiple, discrete heating elements 274 may be provided in the jaw interior 256 of each assembly jaw 250. In other embodiments, a single continuous heating element 274 may be provided in the jaw interior 256 of each assembly jaw 250. Electrical wiring 283 may connect each heating element 274 to a source (not illustrated) of electrical power. Therefore, the pipe heating assembly 220 is adapted to apply heat to the exterior pipe surface 191 of the pipe 190 after the pipe blasting assembly 20 cleans the exterior pipe surface 191 and before the coating liquid 158 is applied to the exterior pipe surface 191 of the pipe 190. A linear actuator (not illustrated) or other suitable mechanism may engage the pipe heating assembly 220 to facilitate bidirectional travel of the pipe heating assembly 220 along the carriage frame member 115 of the apparatus support frame 110 according to the knowledge of those skilled in the art. As illustrated in FIG. 11, in some embodiments of the pipe reconditioning system 101, a controller 108 may interface with each of the functional components of the pipe reconditioning system 101 to facilitate manual or automated control of the pipe reconditioning system 101. As illustrated in FIG. 8, the pipe blasting assembly 20, the pipe heating assembly 220 and the pipe coating assembly 120 may be arranged in linear order or sequence of operation on the carriage frame member 115 of the apparatus support frame 110.

In exemplary application of the pipe reconditioning system 101, a pipe 190 is initially placed in a generally horizontal position on the pipe support frame 102, as illustrated in FIG. 8. The apparatus support frame 110 is then placed on the pipe 190 with the frame foot plates 112 and each pair of frame stabilizing wheels 116 on the frame stabilizing arms 113 engaging the exterior pipe surface 191. As the apparatus support frame 110 is lowered in place on the pipe 190, the assembly jaws 50 of the pipe blasting assembly 20, the assembly jaws 150 of the pipe coating assembly 120 and the assembly jaws 250 of the pipe heating assembly 220 may be opened to provide sufficient clearance for placement of the respective assembly jaws 50, 150 and 250 on opposite sides of the pipe 190. When the pipe blasting assembly 20, the pipe coating assembly 120 and the pipe heating assembly 220 are positioned in place on the pipe 190, the respective assembly jaws 50, 150 and 250 are closed against the respective sides of the pipe 190. The linear actuators (not illustrated) or other mechanisms may be operated to position the pipe blasting assembly 20, the pipe coating assembly 120 and the pipe heating assembly 220 at one end of the carriage frame member 115 of the apparatus support frame 110.

The pipe blasting assembly 20 is initially operated to clean the exterior pipe surface 191 of the pipe 190 as was heretofore described with respect to the apparatus 1 in FIGS. 1-7. As the particulate material 58 (FIG. 5) is ejected against the exterior pipe surface 191, the linear actuator (not illustrated) or other mechanism moves the pipe blasting assembly 20 along the carriage frame member 150 from one end to the other end of the apparatus support frame 110. Simultaneously, each nozzle actuator motor 70 (FIG. 5) may pivot the blast nozzles 74 on each corresponding assembly jaw 50 in a side-to-side motion to ensure complete and uniform cleaning of the entire exterior pipe surface 191 along the length of the pipe 190. Therefore, the pipe blasting assembly 20 substantially cleans and prepares the exterior pipe surface 191 along substantially the entire length of the pipe 190 for subsequent application of coating liquid 158 (FIG. 9) to the exterior pipe surface 191 by operation of the pipe coating assembly 120.

Upon completion of the pipe cleaning operation, movement of the pipe blasting assembly 20 along the carriage frame member 115 is stopped and operation of the pipe blasting assembly 20 is terminated. The pipe heating assembly 220 is next operated to apply heat to the exterior pipe surface 191 of the pipe 190 preparatory to application of the coating liquid 158 on the exterior pipe surface 191. As the heat is applied to the exterior pipe surface 191, the linear actuator (not illustrated) or other mechanism moves the pipe heating assembly 220 along the carriage frame member 150 from one end to the other end of the apparatus support frame 110. Upon completion of the heating operation, movement of the pipe heating assembly 220 along the carriage frame member 115 is stopped and operation of the pipe heating assembly 220 is terminated.

The pipe coating assembly 120 is next operated to apply the coating liquid 158 (FIG. 9) to the heated exterior pipe surface 191 of the pipe 190 through the coating tubing 183 and the respective spray nozzles 174, as was heretofore described with respect to FIG. 9. As the coating liquid 158 is sprayed onto the exterior pipe surface 191, the linear actuator (not illustrated) or other mechanism moves the pipe coating assembly 120 along the carriage frame member 150 from one end to the other end of the apparatus support frame 110. Simultaneously, as illustrated in FIG. 9, each nozzle actuator motor 170 may pivot the spray nozzles 174 on each corresponding assembly jaw 150 in a side-to-side motion to ensure complete and uniform application of the coating liquid 158 to substantially the entire exterior pipe surface 191 along the length of the pipe 190.

Upon completion of the coating application operation, movement of the pipe coating assembly 120 along the carriage frame member 115 is stopped and operation of the pipe coating assembly 120 is terminated. After conclusion of the pipe reconditioning process, the assembly jaws 50 of the pipe blasting assembly 20, the assembly jaws 150 of the pipe coating assembly 120 and the assembly jaws 250 of the pipe heating assembly 220 may be opened to facilitate removal of the pipe reconditioning system 101 from the pipe 190. In applications in which the apparatus 101 is used to treat a pipe 190 having a length which is greater than the length of the apparatus 101, the first segment of the exterior pipe surface 191 may be treated as was heretofore described. The assembly jaws 150 may next be opened, after which the apparatus support frame 110 is moved to an untreated segment of the pipe surface 191 which is adjacent to the treated segment. The apparatus 101 is then operated to treat the untreated segment of the exterior pipe surface 191. The foregoing procedure may be repeated until the pipe surface 191 of the entire length of the pipe 190 is treated.

Figure 12:
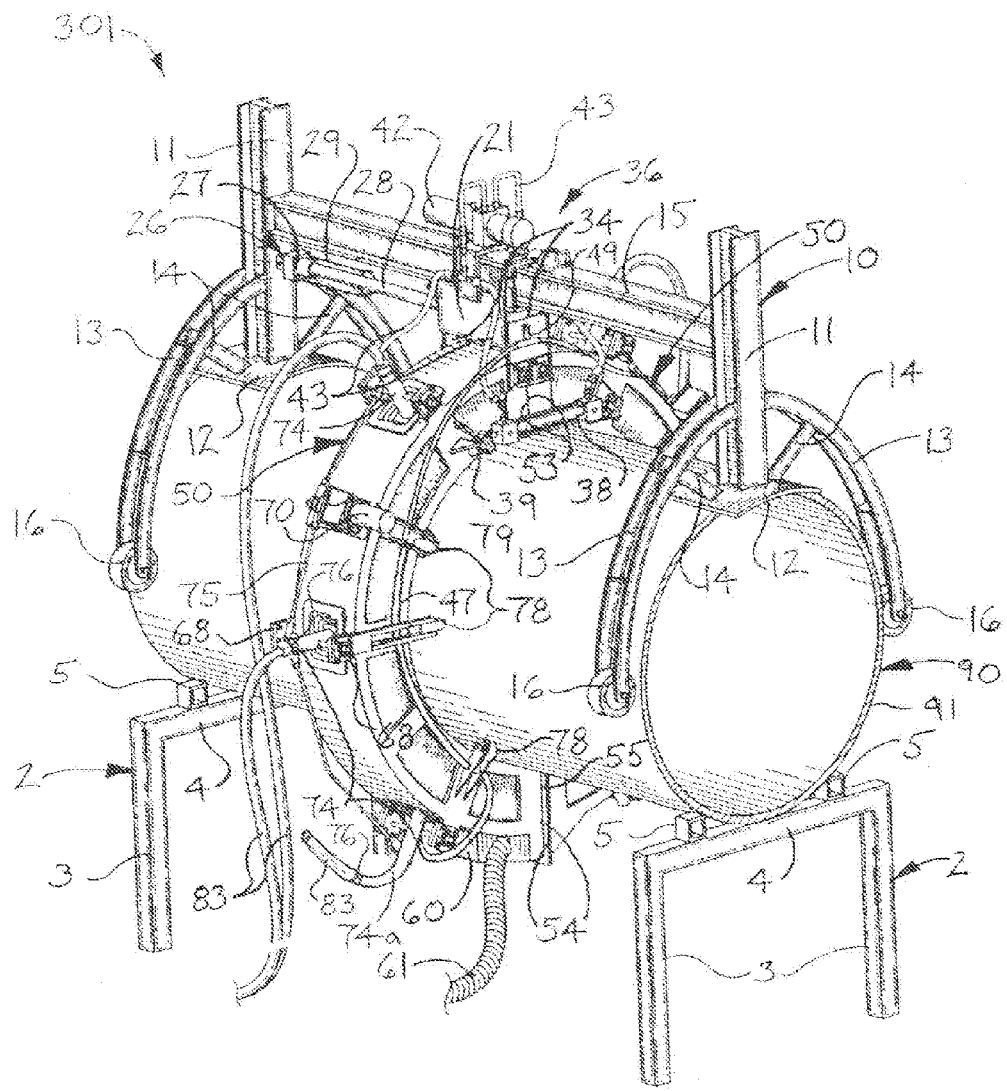
FIG. 12 is a perspective view of an alternative illustrative embodiment of the pipe cleaning apparatus, placed in functional position on a pipe in exemplary application of the apparatus.
Figure 13:
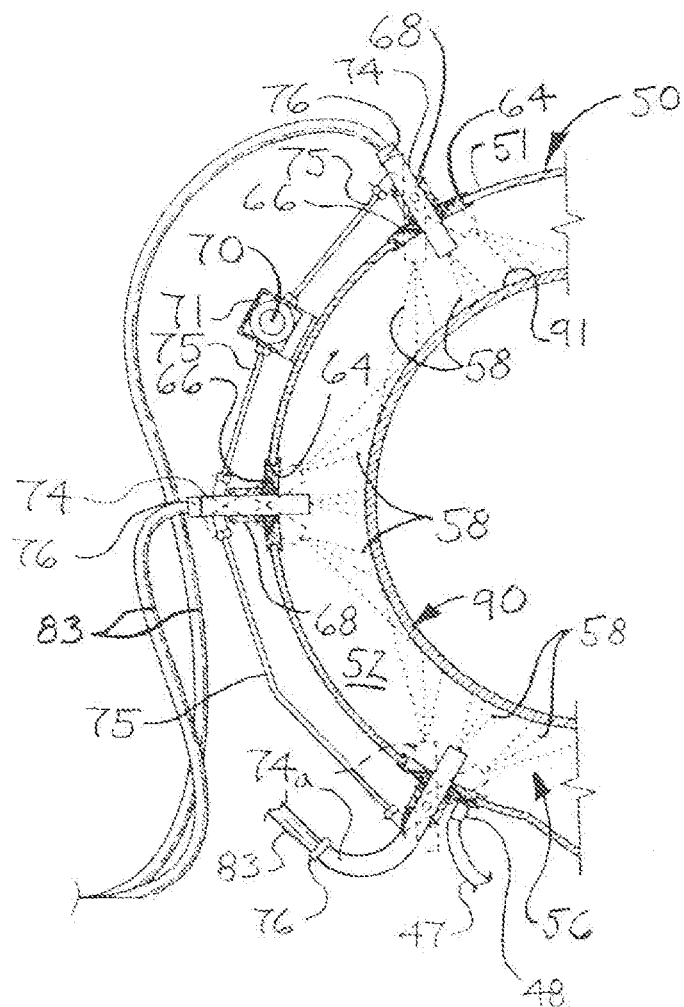
FIG. 13 is a sectional view of a portion of an assembly jaw of an illustrative embodiment of the pipe cleaning apparatus illustrated in FIG. 12, placed in functional position on a pipe (illustrated in section) and more particularly illustrating ejection of particulate material against the exterior surface of the pipe in exemplary application of the apparatus.
Figure 14:
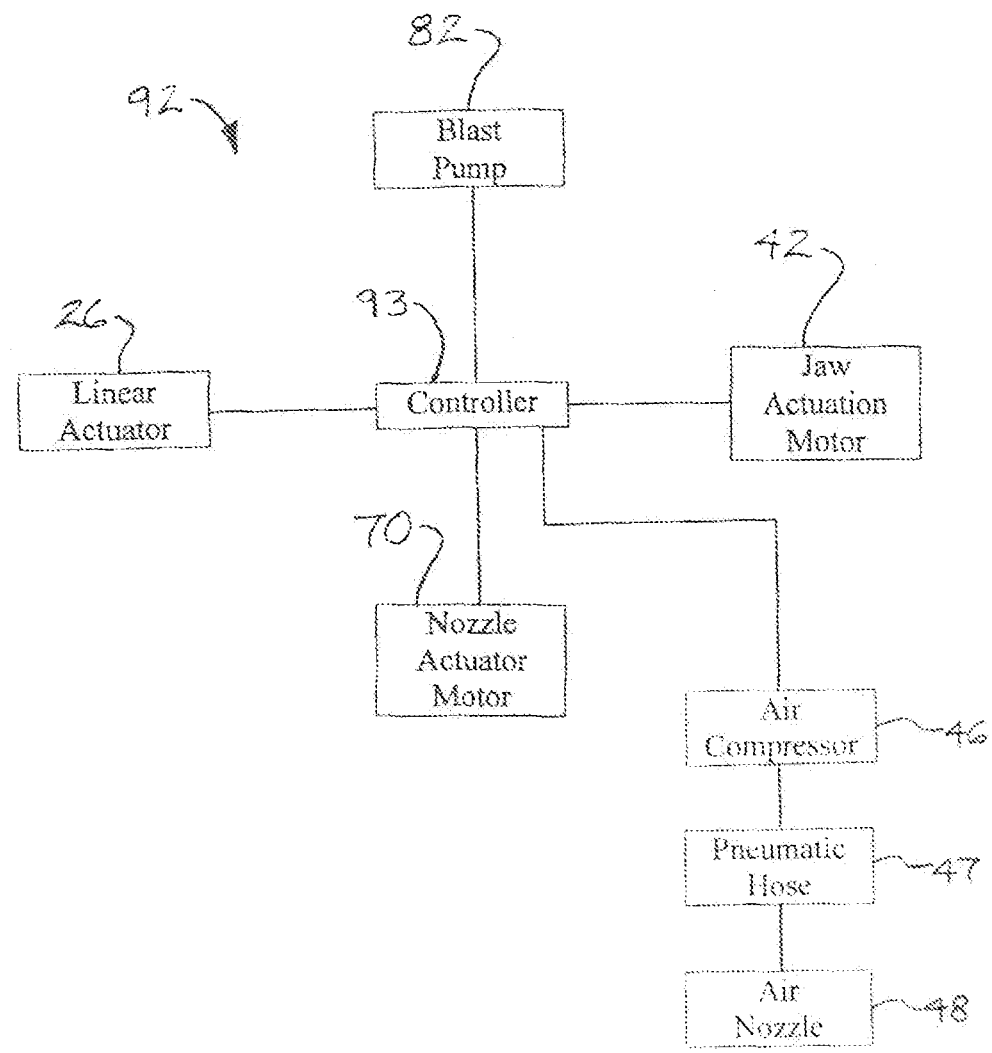
FIG. 14 is a block diagram of an apparatus control system which is suitable for operation of the pipe cleaning apparatus illustrated in FIG. 12.

Referring next to FIGS. 12-14 of the drawings, an alternative illustrative embodiment of the pipe cleaning apparatus 301 placed in functional position on a pipe 90 in exemplary application of the apparatus 301 is illustrated. The apparatus 301 may be similar in design to the apparatus 1 which was heretofore described with respect to FIGS. 1-11, wherein like reference numerals designate like components in FIGS. 12-14. As illustrated in FIG. 12, an air nipple 49 may be provided on a jaw mount plate 34 or other component of the assembly carriage 21. An air compressor 46 (FIG. 14) and a pair of pneumatic hoses 47 may be connected to the air nipple 49. As illustrated in FIG. 13, each pneumatic hose 47 may terminate in an air nozzle 48 which is disposed in fluid communication with the jaw interior 56 of the corresponding assembly jaw 50 at the nozzle boot 60 which is nearest the distal jaw end 54 of the assembly jaw 50. In some embodiments, the air nozzle 48 may extend through a nozzle opening (not illustrated) in the nozzle boot 66. As further illustrated in FIG. 12, in some embodiments each pneumatic hose 47 may extend through a hose opening (not illustrated) in each pair of roller flanges 79 on each assembly jaw 50 as the pneumatic hose 47 extends in a downward course from the air nipple 49 along the assembly jaw 50 to the lowermost nozzle boot 66. Each nozzle boot 66 may include multiple layers of rubber or other resilient materials. In some embodiments, rather than being hardwired, the electrical components of the apparatus 301 may utilize a Canon plug-in system for quick ring change-out.

As illustrated in FIG. 14, an air compressor 46 may interface with the controller 93 of the apparatus control system 92 of the apparatus 301. The pneumatic hose 47 may be disposed in fluid communication with the air compressor 46 through the air nipple 49 (FIG. 12). The pneumatic hose 47 terminates in the air nozzle 48, which is disposed in fluid communication with the jaw interior 56 at the lowermost nozzle boot 66.

Figure 15:
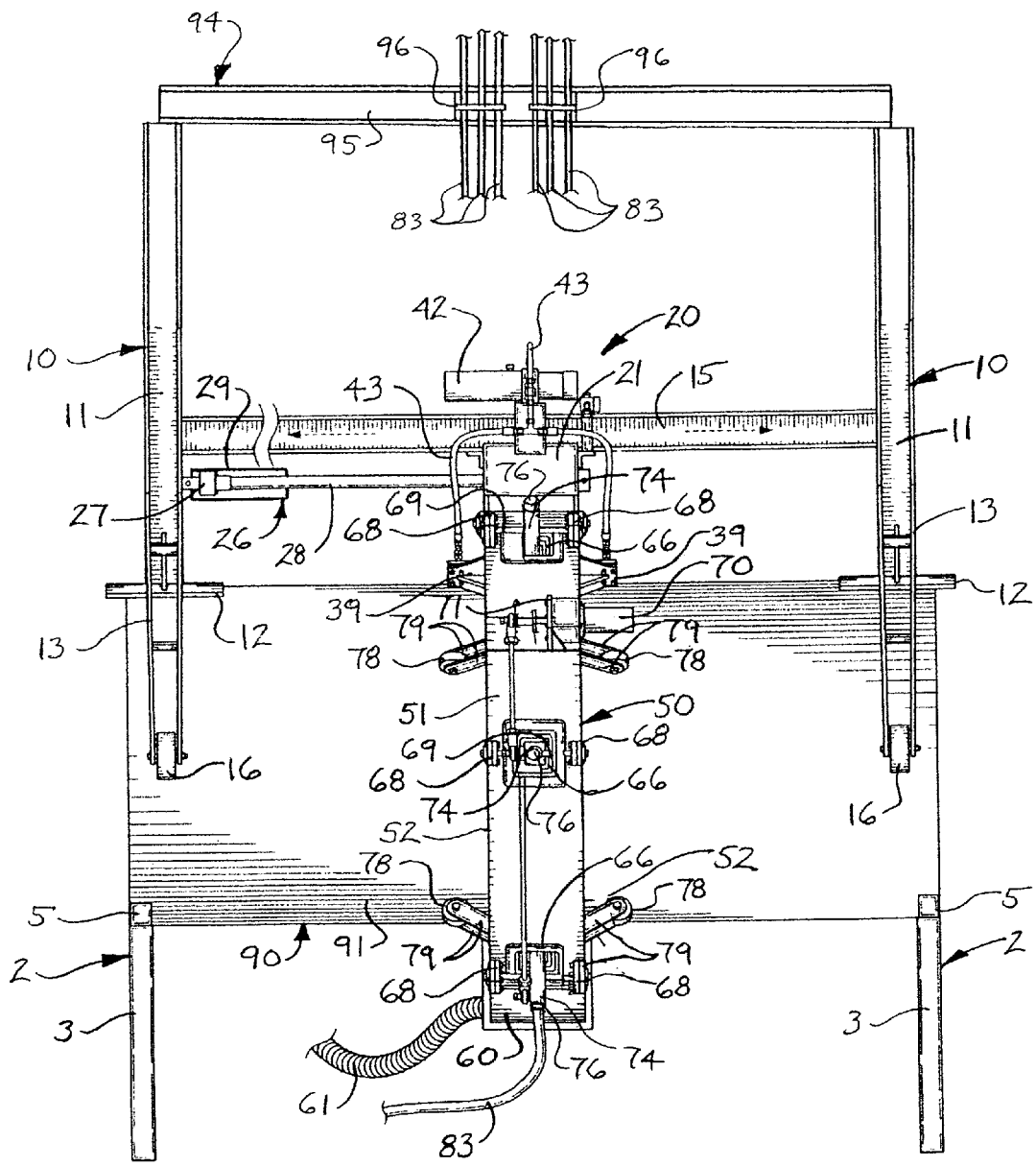
FIG. 15 is a side view of the pipe cleaning apparatus illustrated in FIG. 12, more particularly illustrating a hose hanger provided on the apparatus support frame to support blast tubing.

As illustrated in FIGS. 12, 13 and 15, in some embodiments a quick disconnect hose connector 76 may be provided on each blast nozzle 74. The quick disconnect hose connectors 76 facilitate ease in connecting the blast tubing 83 to the blast nozzles 74 and disconnecting the blast tubing 83 from the blast nozzles 74. The lowermost blast nozzle 74a on each assembly jaw 50 may bend upwardly at a generally 90-degree angle to facilitate ease in attachment of the blast tubing 83 to the lowermost blast nozzle 74a.

As illustrated in FIG. 15, a hose hanger 94 may be provided on the apparatus support frame 10. The hose hanger 94 may include a hose hanger frame 95 which extends between and is supported by the end frame supports 11 of the apparatus support frame 10. At least one hose support bracket 96 may be provided on the hose hanger frame 95. Multiple hose openings (not illustrated) may extend through each hose support bracket 96. Accordingly, the blast tubing 83 for the respective blast nozzles 74 may be extended through the respective hose openings in each hose support bracket 96 such that the hose hanger 94 supports the blast tubing 83 directly over the pipe blasting assembly 20.

Application of the apparatus 301 may be as was heretofore described with respect to application of the apparatus 1 which was heretofore described with respect to FIGS. 1-11. During the course of operation, the particulate material 58 may have a tendency to accumulate by gravity at the lowermost nozzle boot 66 on the assembly jaw 50. Accordingly, the air compressor 46 (FIG. 14) may be operated to blow compressed air through the air nipple 49 and the pneumatic hoses 47, respectively, such that the compressed air is discharged from the air nozzle 48 (FIG. 13) of each pneumatic hose 47 to dislodge the accumulated particulate material 58 at the nozzle boot 66. The dislodged particulate material 58 is typically re-circulated from the jaw interior 56 through the suction box 60, the particulate material return hose 61 and the reservoir 86 (FIG. 6), respectively, for re-use.

While the embodiments of the disclosure have been described above, it will be recognized and understood that various modifications can be made and the appended claims are intended to cover all such modifications which may fall within the spirit and scope of the disclosure.

What is claimed is:

1. A pipe cleaning apparatus, comprising:
an apparatus support frame having at least one end frame member, at least one frame foot plate carried by said at least one end frame member, an elongated carriage frame member carried by said at least one end frame member and at least one frame stabilizer arm extending, from said at least one end frame member;
at least one pipe blasting assembly carried by said carriage frame member of said apparatus support frame and including:
an assembly carriage carried by said carriage frame member;
a pair of generally elongated, semicircular assembly jaws pivotally carried by said assembly carriage and each having a jaw interior;
a plurality of boot openings in each of said assembly jaws;
a plurality of flexible nozzle boots seated in said boot openings, respectively;
a plurality of spaced-apart blast nozzles pivotally carried by each of said assembly jaws in said jaw interior, said plurality of blast nozzles extending through said plurality of nozzle boots, respectively; and
a blast pump communicating with said plurality of blast nozzles; and
a linear actuator engaging said at least one pipe blasting assembly and operable to facilitate travel of said pipe blasting assembly along said carriage frame member.

2. The pipe cleaning apparatus of claim 1 further comprising an air compressor disposed in pneumatic communication with at least one of said nozzle boots.

3. The pipe cleaning apparatus of claim 2 further comprising an air nipple carried by said assembly carriage and disposed in pneumatic communication with said air compressor, a pneumatic hose disposed in pneumatic communication with said air nipple and an air nozzle disposed in pneumatic communication with said pneumatic hose and said jaw interior at said at least one of said nozzle boots.

4. The pipe cleaning apparatus of claim 1 further comprising a plurality of assembly jaw rollers carried by each of said assembly jaws.

5. The pipe cleaning apparatus of claim 1 wherein each of said assembly jaws comprises an outer jaw wall and a pair of spaced-apart side jaw walls extending from said outer jaw wall, and said blast nozzles are carried by said outer jaw wall.

6. The pipe cleaning apparatus of claim 1 further comprising a reservoir disposed in communication with said blast pump and said jaw interior.

7. A pipe cleaning apparatus, comprising:
   an apparatus support frame having a pair of spaced-apart end frame members, a pair of generally curved frame foot plates carried by said end frame members, an elongated carriage frame member extending between said end frame members and a plurality of spaced-apart pairs of frame stabilizer arms extending from said end frame members;
   at least one pipe blasting assembly carried by said carriage frame member of said apparatus support frame and including:
      an assembly carriage carried by said carriage frame member;
      a pair of generally elongated, semicircular assembly jaws pivotally carried by said assembly carriage and each having a jaw interior;
      a plurality of boot openings in each of said assembly jaws;
      a plurality of flexible nozzle boots seated in said boot openings, respectively;
      a plurality of spaced-apart blast nozzles pivotally carried by each of said assembly jaws in said jaw interior, said plurality of blast nozzles extending through said plurality of nozzle boots, respectively; and
      a blast pump communicating with said plurality of blast nozzles; and
   a linear actuator engaging said at least one pipe blasting assembly and operable to facilitate travel of said pipe blasting assembly along said carriage frame member.

8. The pipe cleaning apparatus of claim 7 further comprising an air compressor disposed in pneumatic communication with at least one of said nozzle boots.

9. The pipe cleaning apparatus of claim 8 further comprising an air nipple carried by said assembly carriage and disposed in pneumatic communication with said air compressor, a pneumatic hose disposed in pneumatic communication with said air nipple and an air nozzle disposed in pneumatic communication with said pneumatic hose and said jaw interior at said at least one of said nozzle boots.

10. The pipe cleaning apparatus of claim 7 further comprising a plurality of assembly jaw rollers carried by each of said assembly jaws.

11. The pipe cleaning apparatus of claim 7 wherein each of said assembly jaws comprises an outer jaw wall and a pair of spaced-apart side jaw walls extending from said outer jaw wall, and said blast nozzles are carried by said outer jaw wall.

12. The pipe cleaning apparatus of claim 7 further comprising a reservoir disposed in communication with said blast pump and said jaw interior.

13. A pipe cleaning apparatus, comprising:
   an apparatus support frame having a pair of spaced-apart end frame members, a pair of generally curved frame foot plates carried by said end frame members, an elongated carriage frame member extending between said end frame members, a plurality of spaced-apart pairs of curved frame stabilizer arms extending from said end frame members on opposite sides of a corresponding one of said pair of frame foot plates and a plurality of frame stabilizing wheels carried by said frame stabilizer arms, respectively;
   at least one pipe blasting assembly carried by said carriage frame member of said apparatus support frame and including:
      an assembly carriage carried by said carriage frame member;
      a pair of generally elongated, semicircular assembly jaws pivotally carried by said assembly carriage and each having a jaw interior;
      at least one double-acting pneumatic jaw actuation cylinder carried by said assembly carriage and engaging said assembly jaws;
      a plurality of boot openings in each of said assembly jaws;
      a plurality of flexible nozzle boots seated in said boot openings, respectively;
      a plurality of spaced-apart blast nozzles extending through said nozzle boots into said jaw interior; and
      a blast pump communicating with said plurality of blast nozzles; and
   a linear actuator engaging said at least one pipe blasting assembly and operable to facilitate travel of said pipe blasting assembly along said carriage frame member.

14. The pipe cleaning apparatus of claim 13 further, comprising an air compressor disposed in pneumatic communication with at least one of said nozzle boots.

15. The pipe cleaning apparatus of claim 14 further comprising an air nipple carried by said assembly carriage and disposed in pneumatic communication with said air compressor, a pneumatic hose disposed in pneumatic communication with said air nipple and an air nozzle disposed in pneumatic communication with said pneumatic hose and said jaw interior at said at least one of said nozzle boots.

16. The pipe cleaning apparatus of claim 13 further comprising a plurality of assembly jaw rollers carried by each of said assembly jaws.

* * * * *